(12) United States Patent
McIntyre et al.

(10) Patent No.: US 6,915,074 B2
(45) Date of Patent: Jul. 5, 2005

(54) INDEX PRINTS FOR PHOTOFINISHING SERVICES

(75) Inventors: Dale F. McIntyre, Honeoye, NY (US); William C. Archie, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/871,185

(22) Filed: Jun. 18, 2004

(65) Prior Publication Data

US 2004/0234261 A1 Nov. 25, 2004

Related U.S. Application Data

(63) Continuation of application No. 09/540,463, filed on Mar. 31, 2000, now abandoned.

(51) Int. Cl.[7] .............................................. G03B 17/00
(52) U.S. Cl. ........................ 396/429; 396/611; 355/40
(58) Field of Search ................. 396/429, 611; 355/40, 55

(56) References Cited

U.S. PATENT DOCUMENTS

| | | | | |
|---|---|---|---|---|
| 4,805,039 A | * | 2/1989 | Otake et al. | 386/52 |
| 4,837,652 A | | 6/1989 | Kerby | |
| 4,920,423 A | * | 4/1990 | Shiota | 386/46 |
| 5,031,773 A | * | 7/1991 | Manico et al. | 206/455 |
| 5,119,363 A | | 6/1992 | Satoh et al. | |
| 5,259,504 A | * | 11/1993 | Manico | 206/455 |
| 5,316,464 A | * | 5/1994 | Lexell | 425/318 |
| 5,400,152 A | * | 3/1995 | Manico et al. | 358/501 |
| 5,459,819 A | * | 10/1995 | Watkins et al. | 358/1.18 |
| 5,530,793 A | * | 6/1996 | Watkins et al. | 358/1.18 |
| 5,543,001 A | | 8/1996 | Casillo et al. | |
| 5,602,936 A | | 2/1997 | Green et al. | |
| 5,617,171 A | * | 4/1997 | Ishikawa et al. | 396/512 |
| 5,617,385 A | | 4/1997 | Lee et al. | |
| 5,623,581 A | * | 4/1997 | Attenberg | 358/1.6 |
| 5,683,253 A | | 11/1997 | Park et al. | |
| 5,689,610 A | | 11/1997 | Manico et al. | |
| 5,695,219 A | | 12/1997 | Crawford | |
| 5,706,097 A | * | 1/1998 | Schelling et al. | 358/296 |
| 5,715,511 A | * | 2/1998 | Aslam et al. | 399/320 |
| 5,730,048 A | | 3/1998 | Averill et al. | |
| 5,768,447 A | | 6/1998 | Irani et al. | |
| 5,799,982 A | * | 9/1998 | McClure et al. | 283/81 |
| 5,801,852 A | * | 9/1998 | Truc et al. | 358/502 |
| 5,838,457 A | * | 11/1998 | Umemoto | 358/302 |
| 5,925,200 A | * | 7/1999 | Grossman | 156/60 |
| 5,940,168 A | * | 8/1999 | Ishii | 355/40 |
| 5,951,819 A | * | 9/1999 | Hummell et al. | 156/556 |
| 5,955,239 A | | 9/1999 | Haydock et al. | |
| 5,959,944 A | | 9/1999 | Dockes et al. | |
| 6,019,151 A | | 2/2000 | Wen et al. | |
| D443,309 S | * | 6/2001 | Schultz | D20/11 |
| 6,545,747 B2 | * | 4/2003 | Yoshida et al. | 355/54 |

* cited by examiner

*Primary Examiner*—David M. Gray
(74) *Attorney, Agent, or Firm*—David A. Norais

(57) ABSTRACT

Improved index prints for photofinishing services are provided where the imagettes are grouped by event or subject matter. Permanently attached index print labels incorporating these and other features are provided for digital still image storage devices are also provided. A magnifying storage case which allows easier viewing of the index prints is also provided.

2 Claims, 8 Drawing Sheets

INDEX PRINTS FOR PHOTOFINISHING SERVICES

This is a continuation of application Ser. No. 09/540,463 filed Mar. 31, 2000 now abandoned.

FIELD OF THE INVENTION

This invention relates to photofinishing services and, more particularly, to improved index prints supplied with fulfilled photofinishing service orders.

BACKGROUND OF THE INVENTION

In recent years photofinishing service providers have begun to supply what are known in the trade as "index prints" along with photofinishing process and print orders returned to the customer. These index prints consist of small thumbnail size images (also known as "imagettes"), one for each image printed in the order, typically arrayed on a single 4"×6" sheet. Index prints often have a number printed in the corner of each imagette which corresponds to the frame number of the film from which the prints were made. These index prints are very useful for a quick review of the contents of the order as well as to identify particular negative frame numbers when the customer wishes to order reprints or enlargements.

With the advent of digital imaging, index prints have also proved useful to identify the contents of digital still image storage devices. For example, where digital still images are stored on a compact disk as in a product such as PhotoCD™, manufactured by the Eastman Kodak Co., and the compact disk is in turn stored in a plastic container "jewel case", an index print is often included as an insert in the jewel case arranged so the imagettes corresponding to the contents of the compact disk are visible through the transparent cover of the container. More recently, products such as PictureCD™ and Picture Disk™ have been introduced. In the PictureCD™ product, a compact disk is prepared containing digital still images from a particular roll of film, and for Picture Disk™ the popular and well-known 3½ inch magnetic diskette storage medium (so called "floppy disk") is used to store digital images, again from a particular roll of film. These storage media are returned to the customer in an envelope which also contains an index print very similar to that described above for a conventional photofinishing order.

A problem with index prints in general is that the imagettes on them are of necessity very small images where it may be difficult to comprehend important details such as, for example, the identify of individuals in a photograph or other aspects of the subject matter depicted. A related problem is with certain digital still image storage media where a very large number of images, in some instances as many as several hundred images or more, may be stored. With such a storage medium, it becomes impossible to create an index print of reasonable size where every still image stored on the medium is represented; the area available on a print of reasonable size is too small for this number of imagettes to be printed clearly.

Another problem with index prints is that the span of time or range of subject matter represented on them may be quite large. If the index print was made for a roll of film exposed over say, a year's time, then multiple events may have been photographed and it may be confusing to quickly comprehend the subject matter represented by that roll by a quick glance. Also, as mentioned above, digital still image storage devices may contain a very large number of images relating to a wide variety of subject matter or a particularly long span of time. Creating a useful index print for such a large number of images is difficult.

Still another problem with index prints is that there is the possibility that the index print can become physically separated from the negatives, prints or digital still image storage medium. For example, in the case of the jewel case storage box container or the print inserted in the envelope for PictureCD™, the index print may fall out of the container or envelope and be lost, making it difficult to identify the contents of the storage medium in any way other than booting up a computer to review the contents.

SUMMARY OF THE INVENTION

The foregoing and other objects, features and advantages of the invention will be apparent from the following more particular description of the preferred embodiment of the invention illustrated in the accompanying drawings.

In accordance with one aspect of the present invention there is provided a digital still image storage device having a plurality of digital still images stored therein, the digital still image storage device having visual images displayed thereon which correspond to said digitally stored still images, and wherein the visual images further include a plurality of image groups arranged so as to distinguish one said group from another.

In accordance with another aspect of the present invention there is provided a conventional index print having visual images displayed thereon wherein the visual images further include a plurality of image groups arranged so as to distinguish one said group from another.

In accordance with another aspect of the present invention there is also provided a method for producing an index print for a digital still image storage device, comprising the steps of: obtaining a digital record for each of a plurality of images; producing imagettes for each said digital record; grouping said imagettes into groups corresponding to particular events and/or subject matter represented in said plurality of images; and printing said groups of said imagettes onto a label for said digital storage device.

In accordance with another aspect of the present invention there is also provided a computer storage medium having a software program such that when loaded into a computer, it will cause the computer to carry out the following steps: group the visual image imagettes corresponding to the digital still images stored on a digital still image storage device into groups corresponding to a particular events and/or subject matter represented in said digital still images; and print said groups of imagettes onto a label for attachment to said digital image storage device. In accordance with yet another aspect of this invention, there is also provided a container for storing a CD, the container having a magnifying lens in the front cover which enables the imagettes on the CD stored in the container to be magnified when viewed and therefore more clearly discerned visually.

BRIEF DESCRIPTION OF THE DRAWINGS

In the detailed description of the preferred embodiments of the invention presented below, reference is made to the accompanying drawings in which.

In the detailed description of the preferred embodiments of the invention presented below, reference is made to the accompanying drawings in which.

DETAILED DESCRIPTION OF THE INVENTION

Figure 1A:
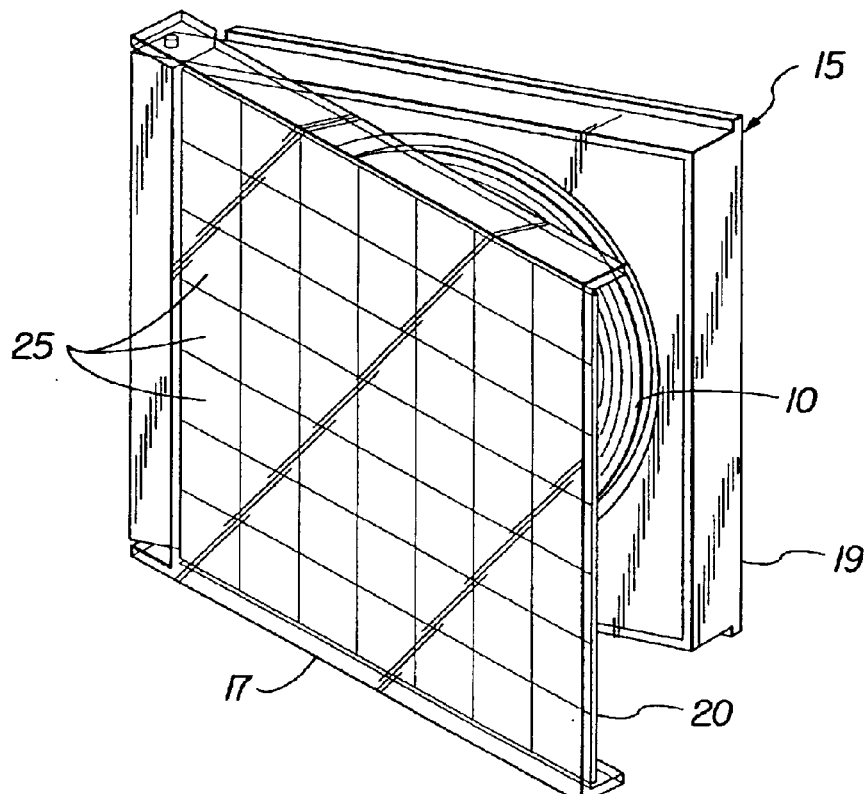
FIGS. 1a–1b represent current prior art configurations and uses of index prints with compact disks.

Turning to FIG. 1a, this figure depicts a prior art index print 20 for use in a compact disk container 15 designed to hold a compact disk (CD) 10. The container 15, often referred to as a "jewel case", comprises a front cover 17 and a base 19 which are hinged along a common edge for allowing opening and closing of the container. The cover 17 is preferably of a clear plastic material to allow viewing of the index print 20 placed therein. The index print 20 consists of thumbnail size "imagettes" 25, each of which corresponds to a digital image stored on the CD 10. The index print 20 on a suitable medium is inserted inside the container 15 so that the imagettes 25 are visible through the transparent front cover. A product which employs use of an index print with a CD is the PhotoCD™ product, manufactured by the Eastman Kodak Company.

Figure 1B:
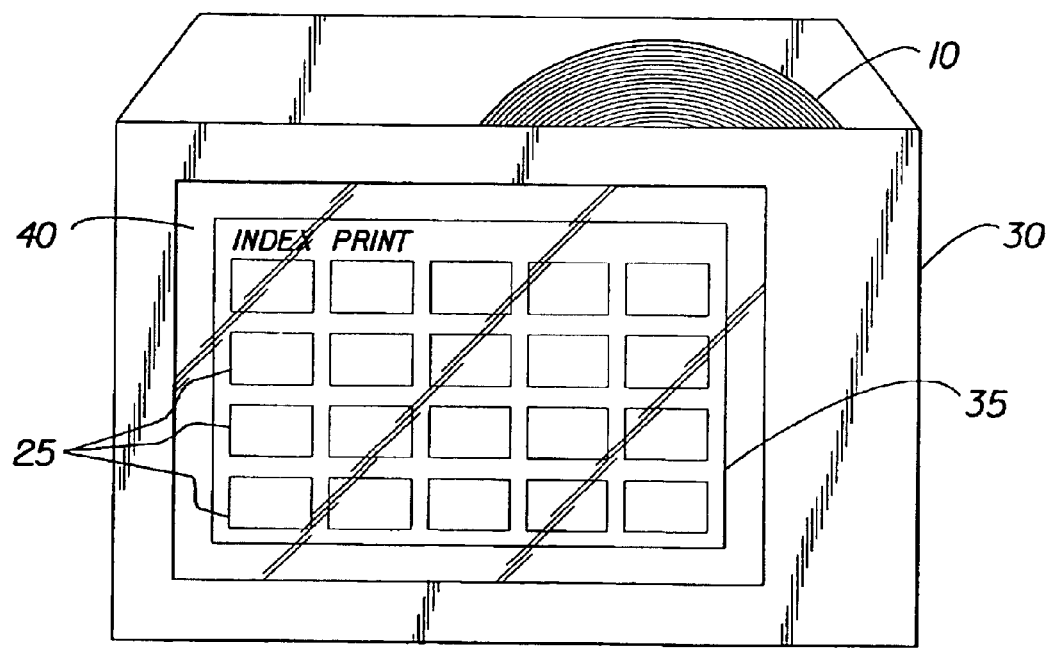

FIG. 1b shows another prior art index print CD system where an index print 35 and CD 10 are inserted into a photofinishing envelope 30 for return to a customer. In this embodiment, the index print 35, typically printed on a 4"×6" piece of output media is inserted into the envelope 30 so that the imagettes 25 are visible through a transparent window 40 provided on the front of the envelope. The imagettes 25 correspond to the images on returned prints in the print order (not shown) as well as digital images stored on the CD 10 also inserted into the envelope 35.

Figure 2A:
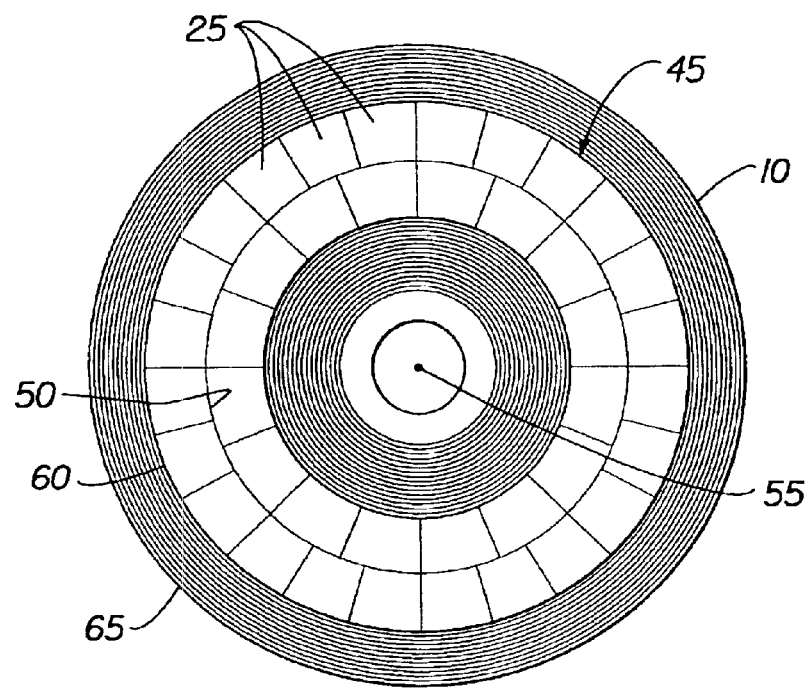
FIGS. 2a–2b depict alternative embodiments of a compact disk with an index print label in accordance with one aspect of the present invention.

Referring to FIG. 2a there is one embodiment of the present invention shown. FIG. 2a shows a CD 10 with an index print label 45 affixed to it where the imagettes 25 corresponding to the digital images stored on the CD 10 are arranged in a radial format on the index print label 45. In this embodiment, the imagettes 25 are printed with the bottom edge 50 of each imagette 25 directed toward the center 55 of the CD 10 and the top 60 of each imagette 25 directed toward the outer edge 65 of the CD 10. Thus for all the imagettes 25 to appear right side up, the CD 10 must be rotated as the imagettes 25 are viewed.

Figure 2B:
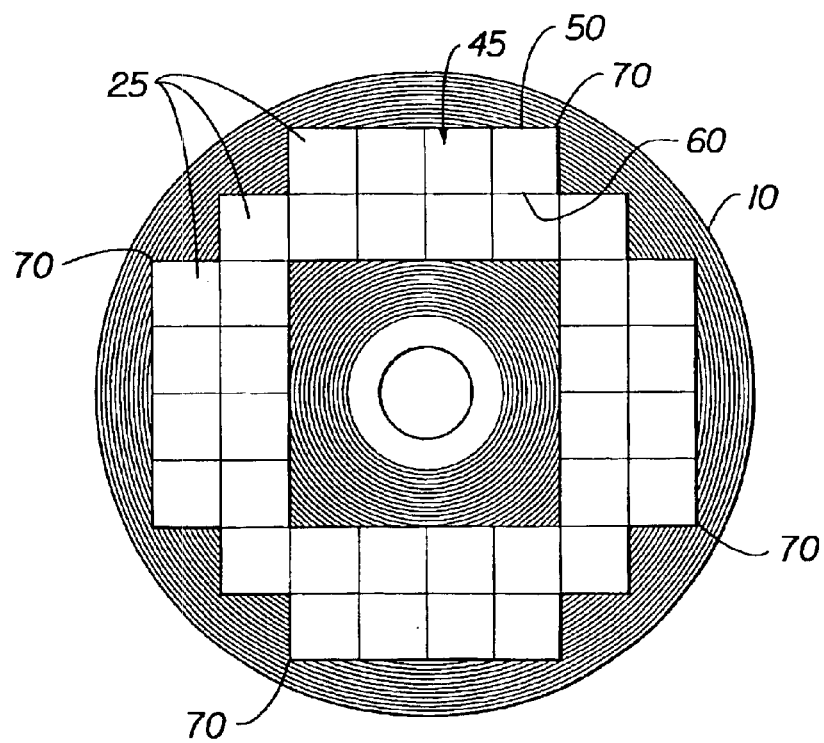

FIG. 2b shows an alternative embodiment in which the index print label 45 affixed to the CD 10 has the imagettes 25 laid out in a grid across the index print label 45. FIG. 2b illustrates a second embodiment, like numerals indicating like parts and operation where the imagettes 25 may be printed so as to be right reading top to bottom in the same direction and all the imagettes 25 appear right side up from just one position of the CD 10. Alternatively, the imagettes 25 are divided into four two row quadrants 70 of imagettes 25, spaced ninety degrees apart. Within each quadrant 70 of imagettes 25, all the imagettes 25 are printed right reading top to bottom. To view the next quadrant of imagettes 25 correctly, the CD 10 is rotated ninety degrees, and so on through the four quadrants 70 of imagettes 25.

It will be appreciated that while only particular configurations of index print labels 45 have been disclosed in detail for the embodiments above, there are also many other variants of image bearing index print labels 45 possible including variations in size, shape, layout, and format, and limited only by the space available for labeling on the surface of the CD 10.

Figure 3:
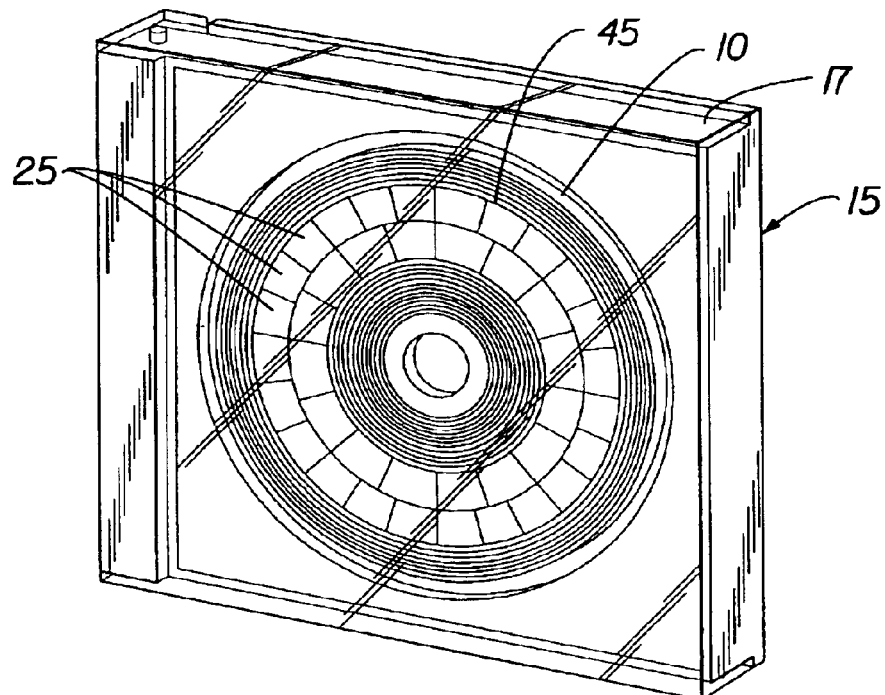
FIG. 3 depicts a container for compact disks with index print labels in accordance with the present invention.

FIG. 3 illustrates a CD 10 with index print label 45 affixed to the top surface of the CD by adhesive and the combination stored in a storage container 15. Since the cover 17 of the container 15 is clear so as to view the label, the imagettes 25 are visible through the cover of the storage container 15 and the contents of the CD 10 can easily be reviewed without removing the CD 10 from its storage container 15.

Figure 4:
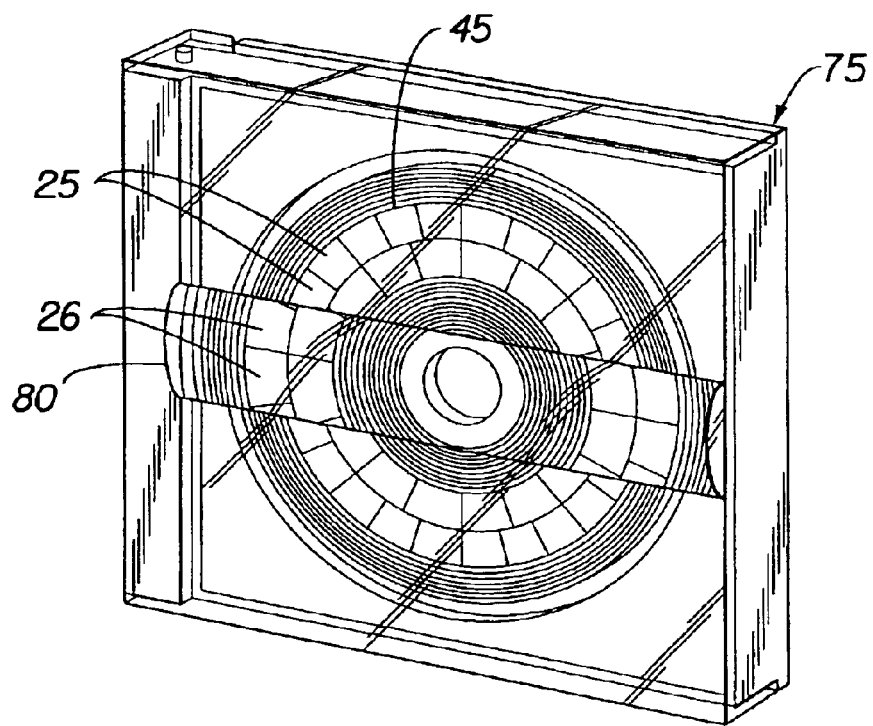
FIG. 4 depicts an alternative embodiment of a container for compact disks with index print labels in accordance with the present invention.

FIG. 4 illustrates a magnifying storage container 75 made in accordance with the present invention. Container 75 includes a magnifying lens section 80 secured to the cover 17 which is useful when a relatively large number of imagettes 25 printed on the index print label and therefore the imagettes 25 must be reproduced at a correspondingly smaller size. The lens section 80 magnifies the imagettes 25, making it easier to visually discern the subject matter of a particular imagette 26. The CD 10 can be easily rotated within the storage container 15 to allow other imagettes 25 to be enlarged.

Figure 5A:
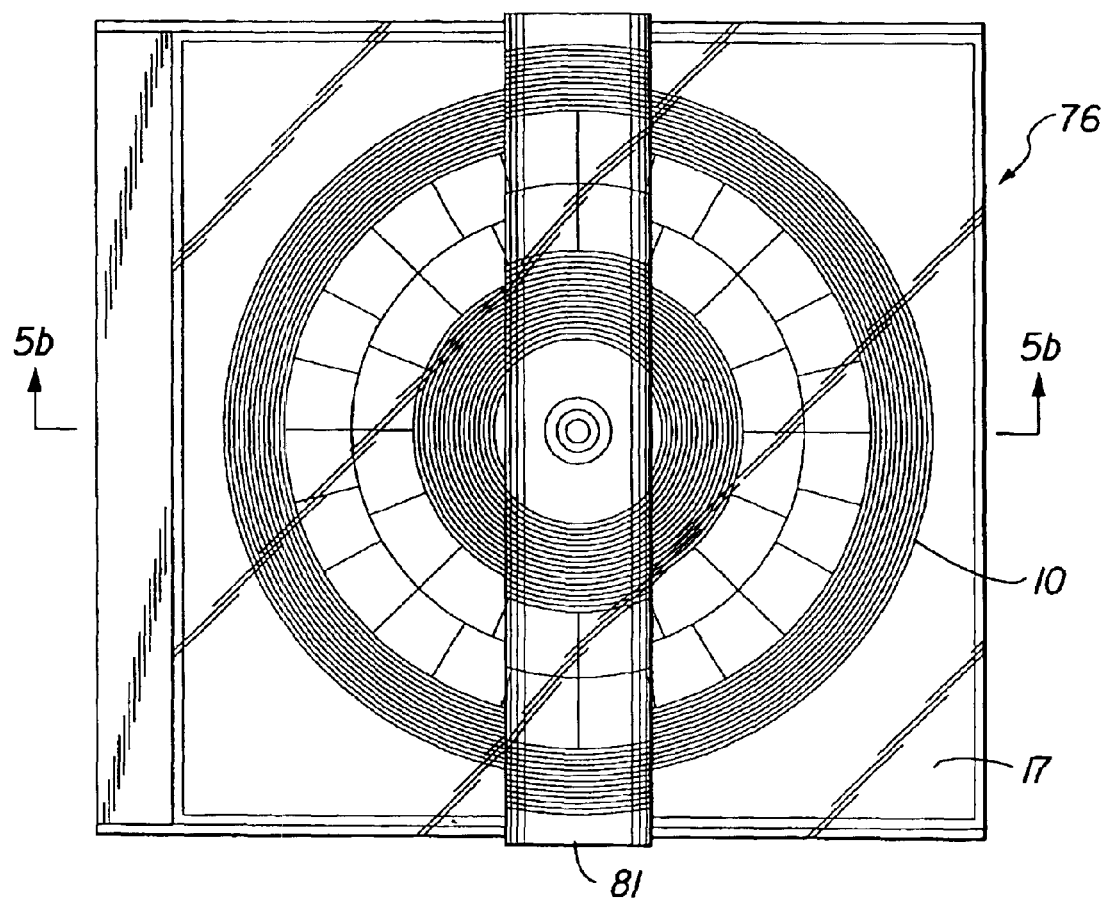
FIG. 5a depicts a top view of an alternative embodiment of a container for compact disks with index print labels in accordance with the present invention.
Figure 5B:
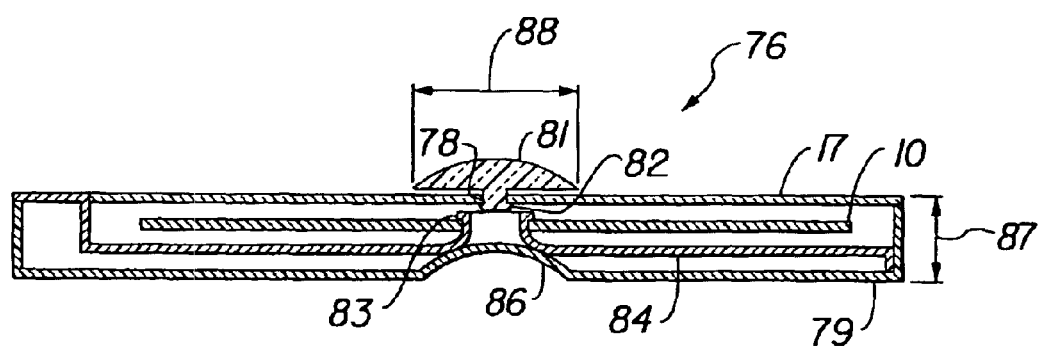
FIG. 5b depicts a cross-sectional view of the container of FIG. 5a as taken along 5b–5b.

FIG. 5a depicts a top view of an alternative embodiment of a magnifying storage container 76 made in accordance with the present invention. FIG. 5b is a cross-sectional view of this same embodiment taken along the line 5b–5b of the embodiment shown in FIG. 5a. In this embodiment, a magnifying lens 81 is rotationally mounted to the cover 17 of storage container 76. Magnifying lens 81 is a plano-convex magnifying lens made in a bar shape from clear plastic, the lens having a length substantially equal to the diameter of the CD to be stored, a focal length substantially equal to the depth 87 of the CD container and a width 88 substantially equal to two times the focal length. When molded-in mounting post 82 is snap-fitted into receiving hole 78 in the cover 17 of storage container 76, the magnifying lens 81 is then able to freely rotate. CD 10 is held in place in storage container 76 by retaining ring 83 which is molded into support insert 84. Recess 86 is molded into the base 79 of storage container 76 to receive magnifying lens 81 when multiple containers are stacked for storage.

Figure 6A:
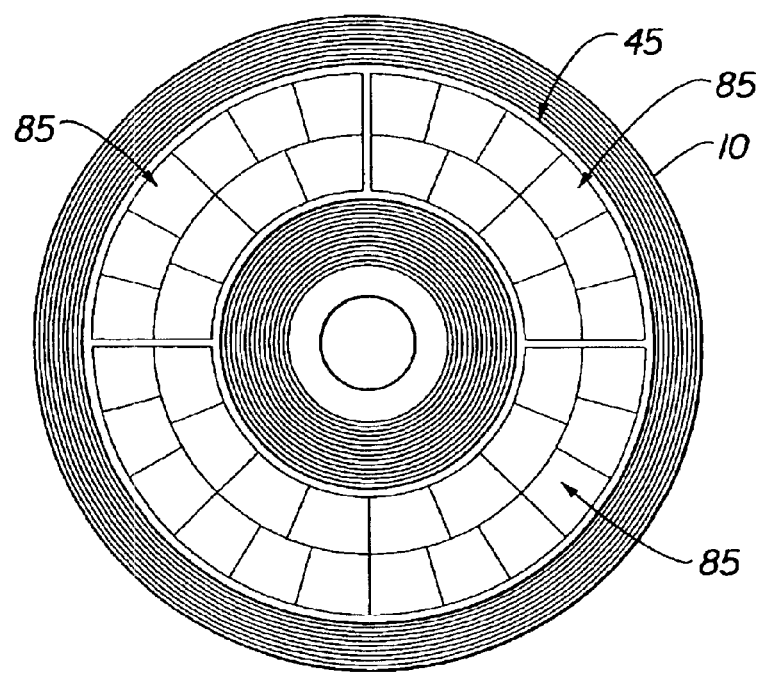
FIGS. 6a–6d depict alternative embodiments of an index print label where the imagettes are grouped in accordance with the present invention.
Figure 6B:
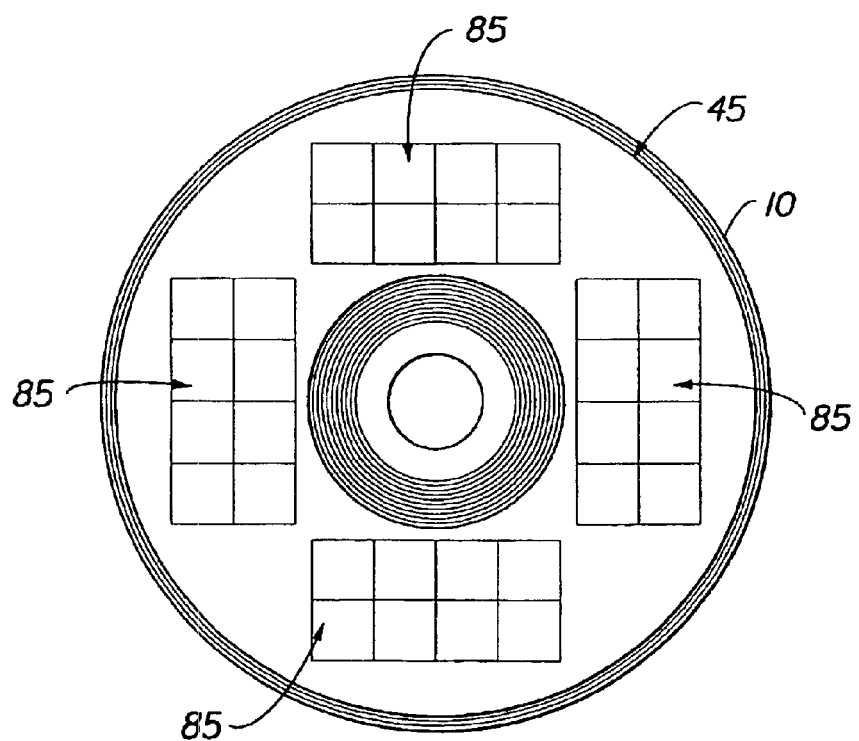
Figure 6C:
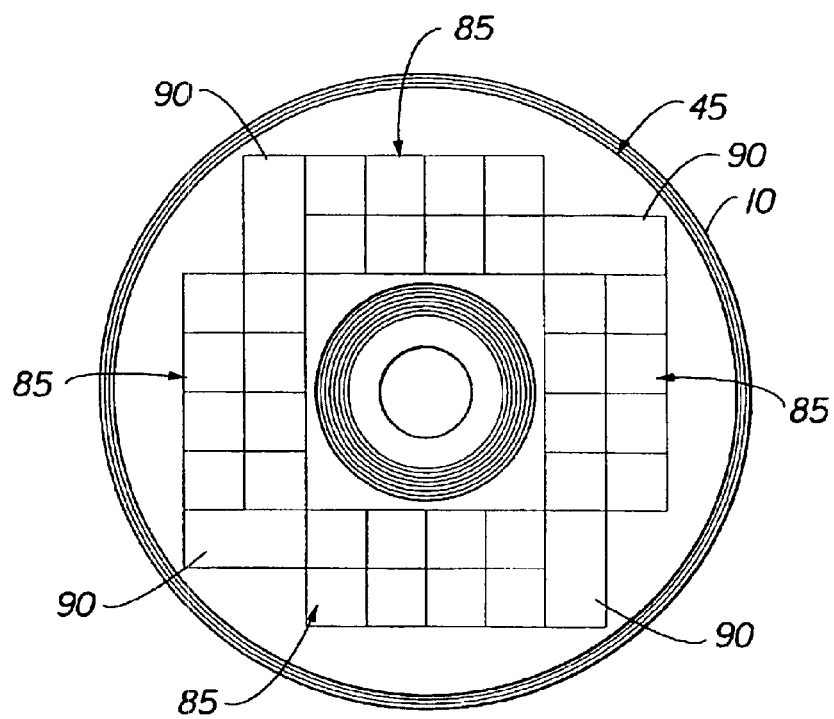
Figure 6D:
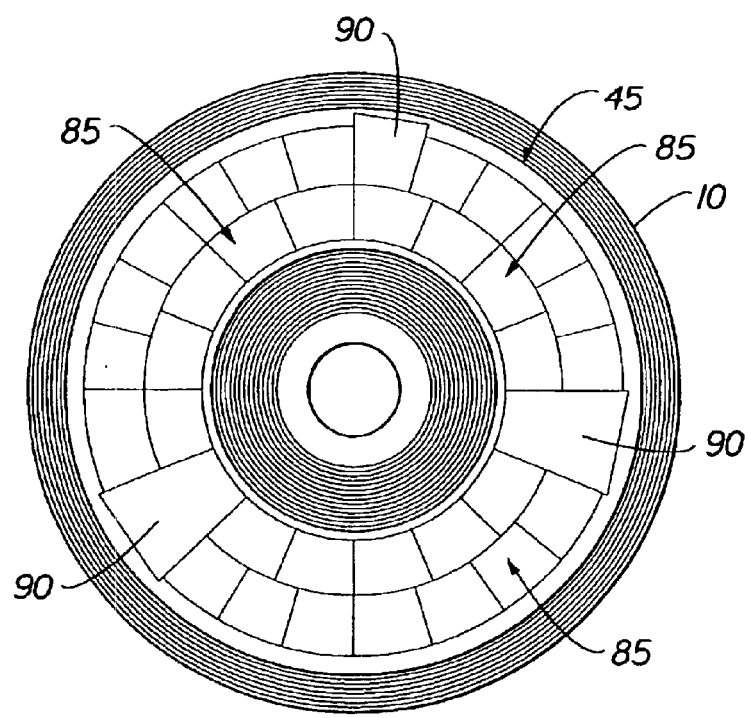

FIGS. 6a–6d illustrate various other embodiments of an index print label 45 where the imagettes 25 are grouped and each group is associated with a particular event, period of time or otherwise related subject matter. Grouping of the imagettes 25 in an index print label 45 by a photoservice provider may be accomplished in a number of ways including manual grouping by an operator or automatically. Several automatic grouping methods are disclosed in co-pending, commonly assigned U.S. Pat. No. 6,389,181, entitled "Photocollage Generation and Modification Using Image Recognition," by Shaffer, et. al. issued May 14, 2002, which is hereby incorporated by reference herein. This copending patent discloses algorithms which use information associated with images on film such as date, time and location to automatically group the images into related groups. Such image information may originate via the Advanced Photographic System™, which has been on the market for several years and which provides for cameras which record image information on a magnetic layer of photographic film such as the date and time a photograph was made and other information which may be input by the photographer at the time of exposure such as location and type of event. Similar image information may originate from a digital camera as well, where commonly employed storage file formats such as EXIF and TIFF support the storage of image information along with the image data itself. Also disclosed in the U.S. Pat. No. 6,389,181 are another class of algorithms which include image processing algorithms which can automatically identify objects and features of an image such as, for example, typical cultural icons such as Christmas trees, birthday cakes, graduation caps, wedding dresses, etc. Both these classes of algorithm can be used either separately or together cooperatively by a photoservice provider to group a series of images automatically into related groups. When the groups have been made, the index print is then printed in a way that clearly shows the groups. In FIGS. 6a and 6b, the index print label 45 is provided in groups 85 which are printed slightly spaced apart one from the other. Each group 85 includes all the imagettes 25 associated with a particular event or similar subject matter. In FIGS. 6c and 6d, the index print label 45 is also has groups 85 but, because the imagettes 25 are printed in a contiguous manner, a representative imagette 90 is enlarged with respect to the other imagettes 25 and is associated with each group to indicate the beginning of a new group. The enlarged representative imagette 90 selected to be printed larger may be selected on the basis that it is, for example, the first image in a date/time group or, alternatively, may be randomly selected from a group consisting of similar subject matter. The enlarged representative imagette 90 is typically printed from at least 30% larger than the other imagettes in the groups 85 up to 100% or more larger, thereby assisting the viewer in more easily recognizing that a new group 85 has begun.

Figure 7A:
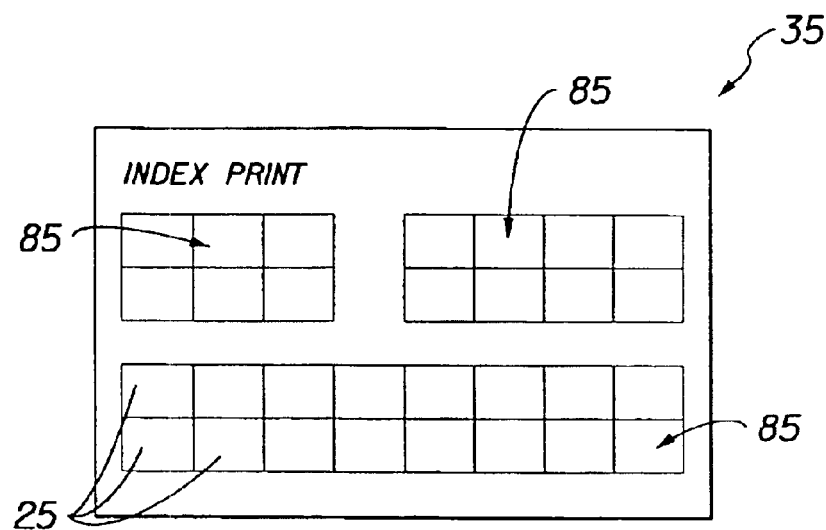
FIGS. 7a–7b depict alternative embodiments of conventional index prints where the imagettes are grouped in accordance with the present invention.
Figure 7B:
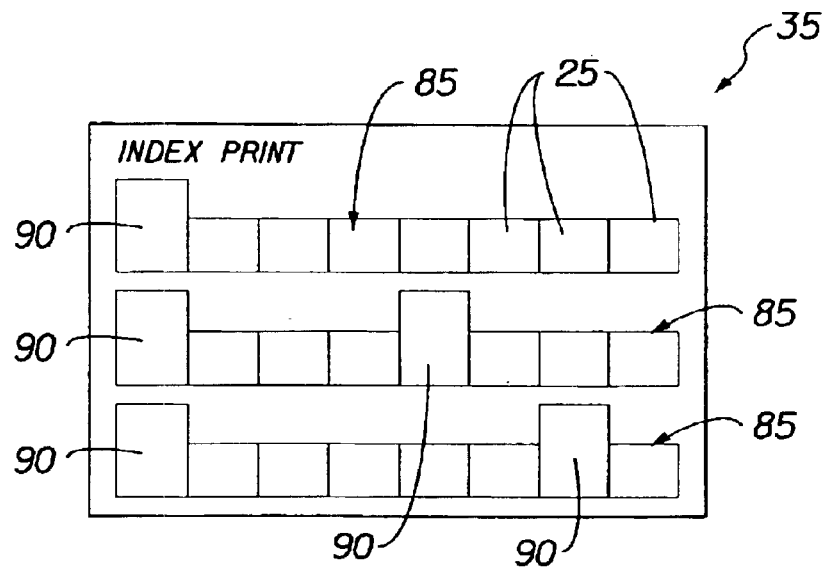

FIGS. 7a–7b illustrate index prints where grouping has been applied to conventional index prints of the type usually supplied in a photofinishing order originating from a single roll of film. In FIG. 7a, the index print 35 has groups 85 of imagettes 25 printed slightly spaced apart one from the other. In FIG. 7b, the imagettes 25 are printed contiguous to one another and an enlarged imagette 90 is associated with each group 85 to indicate the beginning of a new group.

With the use of image compression technology, and depending upon the resolution of images to be stored, it is possible to store a very large number of digital still images on certain digital storage media, for example even up to 1–2000 0.2–0.4 Mb images could be stored on a single CD. In such a situation it will be impossible to make an index print of reasonable size where there is one imagette on the index print for each image stored. In this case it will be advantageous to create an index print where the large number of images stored are first grouped by event or by similar subject matter and then each group is represented by only one imagette. The representative imagette from each group may automatically be selected because, for example it is the first image in a date/time group, or randomly selected as representative of a group consisting of similar subject matter. In a case where there may be only one or a very few logical event or subject matter groups for a very large number of images, an index print can be generated by a random selection of images or by some other sampling plan such as every $n^{th}$ image where n is selected to be a fraction of the total number of images which would yield an index print of reasonable size.

Figure 8:
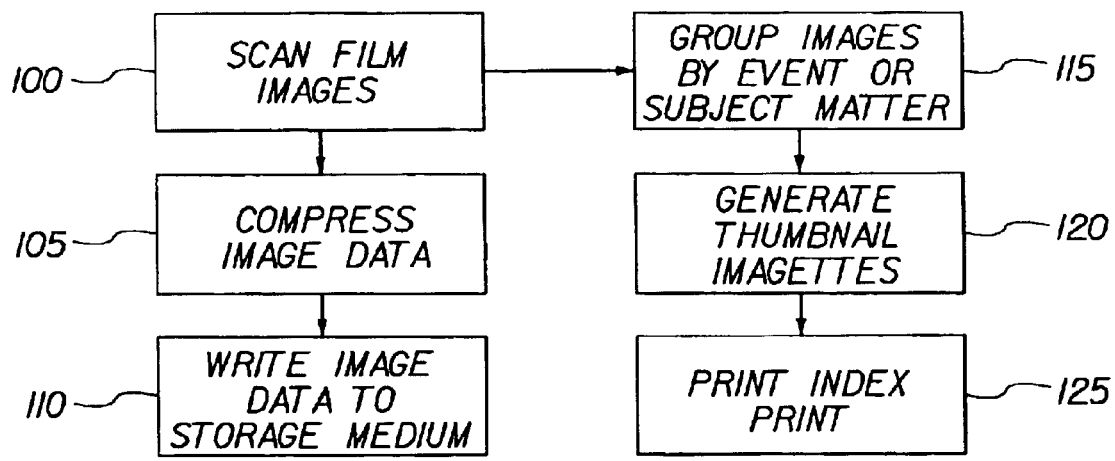
FIG. 8 illustrates workflow used by a photoservice provider to provide index prints in accordance with the present invention.

FIG. 8 shows a representative workflow used by a photoservice provider to provide index prints in accordance with the present invention. Referring to FIG. 8, in a film-based photoservice operation, once a customer submitted film order has been processed, the film is scanned electronically in step 100, to generate high resolution digital image files along with appropriate identifying file header information. These high resolution digital image files are digitally compressed in step 105 and written in step 110 in digital form, for example to an optical compact disk such as Kodak Picture CD™ or 3.5 in magnetic disk such as Picture Disk™ for return to and use by the customer. In a parallel path, also shown in FIG. 8 the digital image files are first grouped in step 115, for example as previously described above and thumbnail size imagettes are generated in step 120. These thumbnail imagettes are then arranged in the desired pattern by well known digital processing and composition techniques and then may be printed out in step 125 as a conventional index print such as those illustrated in FIGS. 7a–7b or on label stock for preparing index print labels such as those illustrated in FIGS. 2a–2b and FIGS. 6a–6d. Digital printing methods suitable for the production of such labels include printing via a CRT or laser printer on silver halide color photographic paper which then may be made into labels. A particularly useful silver halide color photographic paper material for making labels is disclosed in U.S. Pat. No. 5,955,239, by Haydock, et. al. The color photographic paper disclosed in the '239 patent has provision for the image-bearing portion of the material together with a thin base to be stripped away from the thicker paper base and then applied as a thin label to a receiving surface. Any digital printing method may be used to make labels, for example including but not limited to resistive head thermal printing or inkjet printing or laser printing; adhesive backed label stock media for output from these devices is well known.

Figure 9:
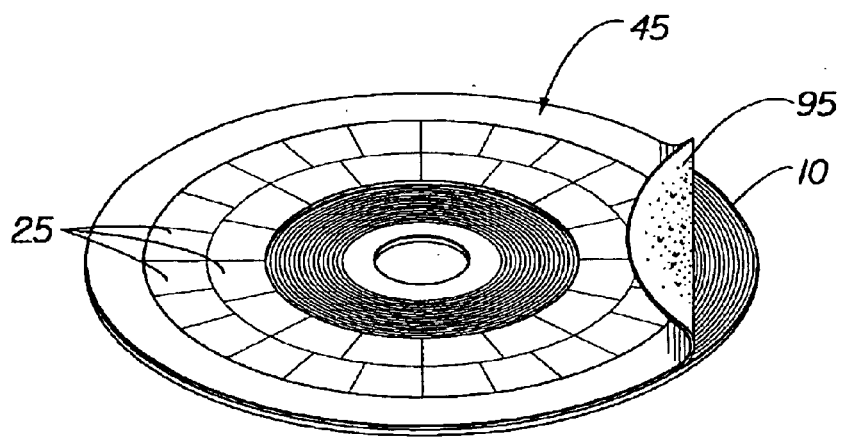
FIG. 9 illustrates the configuration of an adhesive-backed index print in accordance with the present invention.

Once the label has been printed, it is cut by an appropriate technique to the appropriate size, brought together with the customer's CD 10 and applied to the surface of the CD 10. FIG. 9 illustrates an index print label 45 where the imagettes 25 are printed on the front side of the index print label 45 and an adhesive backing 95 present on the reverse side is used to adhere the index print label 45 to the CD 10. Methods for application of self-adhesive labels to CDs 10 are well known. U.S. Pat. No. 5,543,001, to Casilio et. al. discloses an example of a suitable method; however, any suitable means for applying labels to CDs may be used In an alternative method of applying the index print label 45 to CD 10, CD 10 with an ink receptive surface is printed upon directly. Commonly assigned U.S. Pat. No. 6,019,151 by Wen discloses a system for printing images directly upon the surface of compact disks by thermal resistive head dye printing. Other methods such as laser printing or ink jet may of course also be adapted for direct printing of images on CD label surfaces.

A workflow analogous to the one above may be described for an all-digital pathway where a customer order for a compact disk arrives at the photoservice provider in the form of a set of digital image files comprising a particular order. In a manner analogous to that described above for image files derived from film, the digital image files may be grouped, reduced to thumbnail imagettes and printed on label stock or directly on the surface of the CD 10.

The invention has been described in detail with particular reference to certain preferred embodiments, in particular compact disk embodiments, but it will be appreciated that the invention may be applied to any digital image storage devices having a surface suitable for labeling permanently associated with the storage medium including PhotoCD™, or any other optical disk storage device having a labeling surface thereon, or any magnetic digital image storage device such as a 3½ inch "floppy disk", or other transportable magnetic storage disks such as, for example, those designed for use with the well known ZIP™ or JAZZ™ drive storage devices.

The invention has been described in detail with particular reference to certain preferred embodiments thereof, but it will be understood that variations and modifications can be effected within the spirit and scope of the invention.

Parts List 10 compact disk (CD)
15 storage container
16 cover of storage container
19 base of storage container
20 index print for CD storage container
25 imagettes
26 magnified imagettes
30 photofinishing order envelope
35 index print
40 transparent window
45 index print label
50 bottom edge
55 center
60 top edge
65 outer edge
70 quadrant
75 magnifying storage container
76 magnifying storage container
77 cover of storage container
78 hole
79 base of storage container
80 magnifying lens
81 magnifying lens
82 mounting post
83 retaining ring
84 support insert
85 imagette group
86 recess
87 container depth
88 magnifying lens width
90 enlarged imagette
95 adhesive backing
100 film scanning step
105 image data compression step
110 data writing step
115 image grouping step
120 thumbnail image generation step
125 print index print step

What is claimed is:

1. An index print having a plurality of visual imagettes displayed thereon, wherein said visual imagettes on said index print are placed on said index print into a plurality of groups, each of said groups comprising at least two of said visual imagettes, each of said groups corresponding to a particular event and/or subject matter and having a visually distinct feature that distinguishes a beginning of one group from another group;

wherein said visually distinct feature comprises one of said visual imagettes from each of said image groups being enlarged with respect to the other imagettes, and said enlarged imagette of each of said groups indicates the beginning of a new group.

2. A method for producing an index print, comprising the steps of:

obtaining a digital record for each of a plurality of images;

producing imagettes for each said digital record;

grouping said imagettes on said index print into a plurality of visual groups corresponding to particular events and/or subject matter and each of said groups having a visually distinct feature that distinguishes a beginning of one group form another group, wherein each of said groups comprises at least two of said imagettes, said grouping step further comprising providing for said visually distinct feature by enlarging, with respect to the other imagettes, one of said imagettes from each of said image groups, such that said enlarged imagettes indicate the beginning of a new group; and printing said imagettes onto an index print so that the imagettes in each of said groups are grouped together.

* * * * *